Patented May 13, 1947

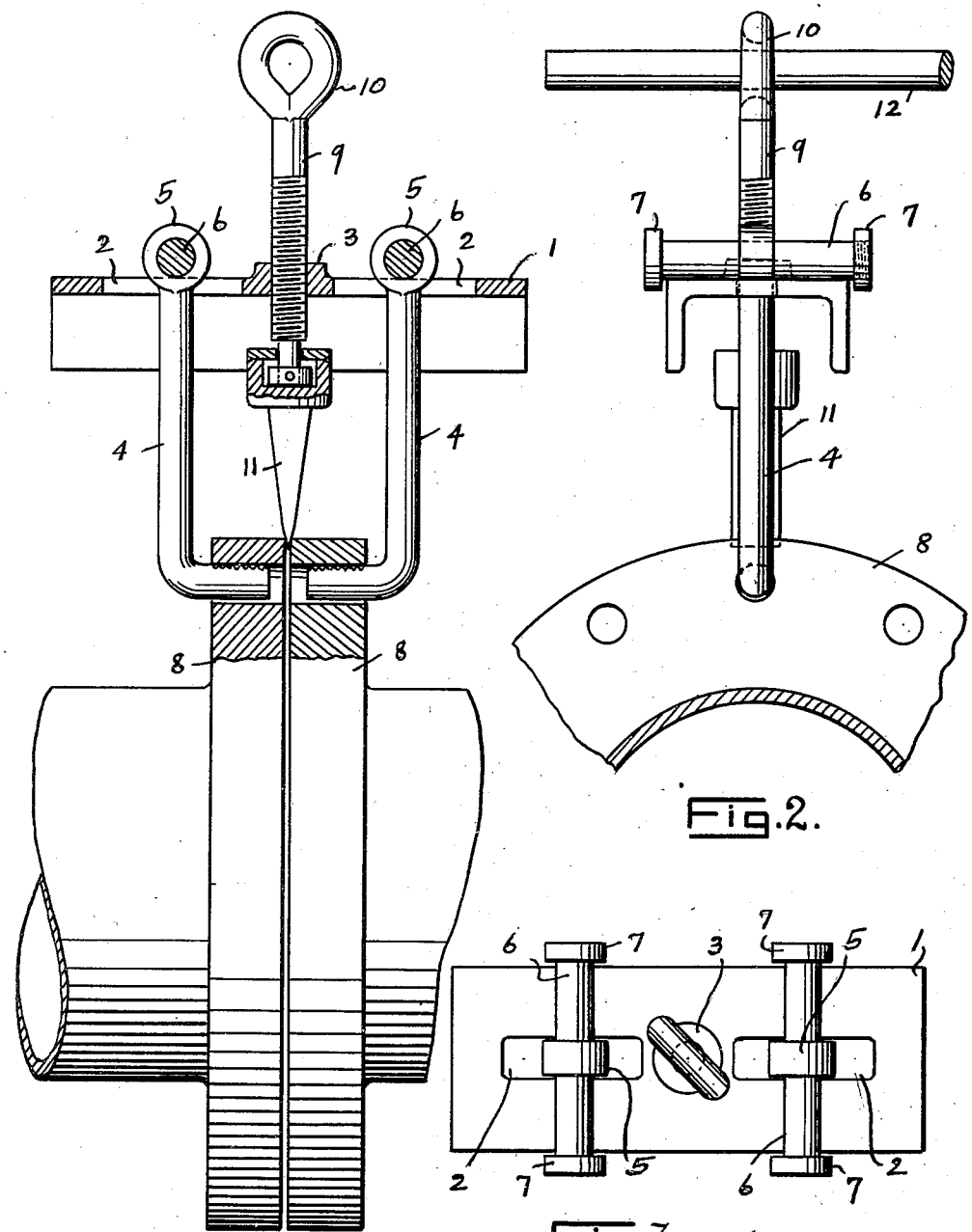

2,420,438

UNITED STATES PATENT OFFICE 2,420,438

FLANGE JACK

Marshall M. Morgan, Tyler, Tex.

Application December 30, 1944, Serial No. 570,729

2 Claims. (Cl. 254—100)

1

This invention relates to a jack.

An object of the invention is to provide a jack of the character described for separating flanged pipe connections in order that the sealrings between the flanges may be removed or replaced.

A further object of the invention is to provide a jack of the character described which is readily portable and which may be easily applied to the work.

With the above and other objects in view the invention has particular relation to certain novel features of construction, operation and arrangement of parts, examples of which are given in this specification and illustrated in the accompanying drawings, wherein—

Figure 1 shows an elevational view, partly in section, of the jack as applied to the work.

Figure 2 shows an end view, and

Figure 3 shows a top plan view.

Referring now more particularly to the drawings wherein like numerals of reference designate the same parts in each of the figures, the numeral 1 designates a channel plate having the longitudinal end slots 2, 2 and having a central thickened portion 3.

The numerals 4, 4 designate hooks whose upper ends extend through the slots 2 and are formed with eyes 5, 5 to receive the rollers 6, 6 which work on the plate 1. These rollers have enlarged heads 7, 7 on their ends to prevent their detachment from the hooks.

The lower ends of the hooks 4 are inwardly turned so as to fit into the aligned bolt holes of the flanges 8, 8 after the bolts have been removed therefrom, and their operative faces may be serrated, as shown in Figure 1 to prevent slippage.

Threaded through the central thickened portion 3 there is a rod 9 whose upper end has an eye 10. Depending from said rod and having a swivelling connection therewith there is a wedge 11.

The joint between the flanges connecting pipe sections is usually sealed by means of a gasket between the flanges. In case of leak from a defective gasket it must be removed and a new one substituted. In such case the bolts connecting the flanges are removed and the inwardly turned ends of the hooks 4 may be then inserted into aligned bolt holes with the wedge 11 aligned with the joint between the flanges. A rod 12 may then be inserted through the eye 10 and the rod 9 screwed inwardly thus forcing the wedge 11 between the flanges. In actual practice two of the jacks will be used one opposite the other so that the flanges will be simultaneously moved apart all the way around. When the flanges are moved apart a sufficient distance the gasket may be removed from between them and a new one substituted and the bolts connecting the flanges then replaced.

The slots 2 are provided so that in application of the jack to the work the hooks may be moved far enough apart so that the inwardly turned ends will readily enter the bolt holes and the hooks may then be moved inwardly the required distance. As the flanges are spread apart the rollers move outwardly along the plate 1 thus maintaining hooks 4, 4 parallel to prevent them from binding.

What I claim is:

1. A jack for separating the flanges connecting pipes comprising, a wedge adapted to enter the joint between the flanges, a plate having end slots, a jack screw threaded through the plate and having a swivelling connection with the wedge, hooks having inwardly turned ends adapted to enter bolt holes in the flanges and whose other ends extend through said slots, cross rods on the plate supporting said hooks and means for rotating the jack screw.

2. A jack for separating the flanges connecting pipes comprising, a wedge adapted to enter the joint between the flanges, a supporting member disposed in substantially parallel relation with the pipe and having spaced elongated slots, a jack screw threaded through the supporting member and having a swivelling connection with the wedge, connecting members each having means thereon, at one end, shaped to enter bolt holes in the flanges and whose other ends extend through said slots, cross members on the supporting member supporting the connecting members and means for rotating the jack screw.

MARSHALL M. MORGAN.

REFERENCES CITED

The following references are of record in the file of this patent:

UNITED STATES PATENTS

| Number | Name | Date |
|---|---|---|
| 2,352,290 | Saul et al. | June 27, 1944 |
| 2,350,404 | Liston | June 6, 1944 |
| 2,221,125 | Ball | Nov. 12, 1940 |
| 1,380,559 | Jespersen | June 7, 1921 |
| 1,244,327 | Hargrave | Oct. 23, 1917 |